(12) United States Patent
Yun et al.

(10) Patent No.: US 8,709,610 B2
(45) Date of Patent: Apr. 29, 2014

(54) BIAXIALLY ORIENTED FILM WHICH COULD BE THERMALLY LAMINATED WITH PAPER AND OTHER SUBSTRATES

(75) Inventors: Xiao Bing Yun, Beijing (CN); Jian-ping Pan, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 241 days.

(21) Appl. No.: 13/124,334

(22) PCT Filed: Oct. 17, 2008

(86) PCT No.: PCT/CN2008/072731
§ 371 (c)(1),
(2), (4) Date: Apr. 14, 2011

(87) PCT Pub. No.: WO2010/043084
PCT Pub. Date: Apr. 22, 2010

(65) Prior Publication Data
US 2011/0268966 A1 Nov. 3, 2011

(51) Int. Cl.
*B32B 27/32* (2006.01)
*B32B 17/10* (2006.01)
*B32B 27/08* (2006.01)
*B32B 29/00* (2006.01)

(52) U.S. Cl.
USPC ......... 428/515; 428/220; 428/339; 428/537.5

(58) Field of Classification Search
None
See application file for complete search history.

(56) References Cited

U.S. PATENT DOCUMENTS

| | | | |
|---|---|---|---|
| 3,645,992 A | 2/1972 | Elston | |
| 4,505,969 A | 3/1985 | Weiner | |
| 4,522,887 A | 6/1985 | Koebisu et al. | |
| 4,643,928 A | 2/1987 | Kimura et al. | |
| 4,886,698 A | 12/1989 | Purdy | |
| 5,272,236 A | 12/1993 | Lai et al. | |
| 5,278,272 A | 1/1994 | Lai et al. | |
| 6,010,588 A | 1/2000 | Stahl et al. | |
| 6,423,420 B1 * | 7/2002 | Brant et al. | 428/516 |
| 6,686,055 B2 | 2/2004 | Tanaka et al. | |
| 6,756,098 B2 | 6/2004 | Zhou et al. | |
| 6,844,079 B2 | 1/2005 | Holzer et al. | |
| 6,960,635 B2 | 11/2005 | Stevens et al. | |
| 8,288,470 B2 | 10/2012 | Ansems et al. | |
| 2002/0182426 A1 | 12/2002 | Tanaka et al. | |
| 2004/0105994 A1 | 6/2004 | Lu et al. | |
| 2005/0100695 A1 * | 5/2005 | Holbert et al. | 428/34.2 |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199884 A1 | 9/2006 | Hoenig et al. | |
| 2006/0199887 A1 | 9/2006 | Liang et al. | |
| 2006/0199896 A1 | 9/2006 | Walton et al. | |
| 2006/0199897 A1 | 9/2006 | Karjala et al. | |
| 2006/0199905 A1 | 9/2006 | Hughes et al. | |
| 2006/0199906 A1 | 9/2006 | Walton et al. | |
| 2006/0199907 A1 | 9/2006 | Chang et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | Li Pi Shan et al. | |
| 2006/0199931 A1 | 9/2006 | Poon et al. | |
| 2006/0199983 A1 | 9/2006 | Kammerhofer et al. | |
| 2006/0257673 A1 | 11/2006 | Desor et al. | |
| 2010/0209640 A1 | 8/2010 | Yun | |

FOREIGN PATENT DOCUMENTS

| | | |
|---|---|---|
| CN | 1958285 A | 5/2007 |
| CN | 101100833 A | 1/2008 |
| EP | 0733476 A2 | 9/1996 |
| JP | 54116406 A | 9/1979 |
| JP | 54116408 A | 9/1979 |
| JP | 09150491 A | 6/1997 |
| JP | 10-080987 A | 3/1998 |
| JP | 2000-264331 A | 9/2000 |
| JP | 2001310433 A | 11/2001 |
| JP | 2005-035147 A | 2/2005 |
| JP | 2006-321164 A | 11/2006 |
| KR | 180883 | 5/2000 |
| KR | 2003052552 | 6/2003 |
| KR | 2006129623 | 12/2006 |
| WO | 9630209 A1 | 10/1996 |
| WO | 9722470 A1 | 6/1997 |
| WO | 9821274 A1 | 5/1998 |
| WO | 0037240 A1 | 6/2000 |
| WO | 2005/090427 A1 | 9/2005 |
| WO | 2008076535 A2 | 6/2008 |

OTHER PUBLICATIONS

PCT/CN2008/072731, International Search Report and the Written Opinion of the International Searching Authority.
PCT/CN2008/072731, International Preliminary Report on Patentability.

* cited by examiner

*Primary Examiner* — Sheeba Ahmed

(57) ABSTRACT

Multilayer thermoplastic film structures are described which comprise at least two layers. One layer comprises a homopolymer polypropylene and a second layer, which is at least 3 microns thick, comprises a polyolefin material with a melting point of from 90° C. to 105° C. The film structures are particularly suited for lamination onto substrates such as paper or paper board.

10 Claims, 2 Drawing Sheets

BIAXIALLY ORIENTED FILM WHICH COULD BE THERMALLY LAMINATED WITH PAPER AND OTHER SUBSTRATES

FIELD OF THE INVENTION

The present invention relates to multilayer thermoplastic film structures. The film structures comprise at least two layers, one layer being a homopolymer polypropylene layer and a second layer at least 3 microns thick, comprising a polyolefin material with a melting point of from 90° C. to 105° C. The film structures are particularly suited for lamination onto substrates such as paper or paper board.

BACKGROUND AND SUMMARY OF THE INVENTION

Thermoplastic film structures are used in a wide variety of applications. One type of film structure commonly used in the art is a biaxially oriented polypropylene (BOPP) film structure, which comprises at least one polypropylene-containing layer. BOPP film is widely used to laminate to substrates such as paper or paper board for applications including book covers, food packaging, toy packaging or cardboard boxes. BOPP film not only affords water resistance but also provides a high gloss surface, which is desired in many applications. However, BOPP film also exhibits some less than desirable traits for some applications.

For example, in lamination applications, the film structure must achieve strong lamination bonds with the substrate to which it is being laminated. Traditional BOPP films do not readily adhere to substrates such as paper or paper board. Typically, this deficiency was overcome by adhesive lamination which uses a solvent or water based adhesive on BOPP film surface (sometimes in combination with treating the BOPP film surface, such as by corona discharge treatment, flame treatment, plasma treatment or metallizing treatment) and then bonds the oriented film with the substrate. The water or solvent is then removed using a long heating oven which is very energy consumptive. This method also generates pollution, and possible odor/taint problems in the final laminate. The efficiency of this process is also low due to the low speed of the drying process, and the requirement of an additional step to apply the adhesive.

Other popular approaches in the industry include extrusion coating an ethylene vinyl acetate (EVA) layer onto a BOPP surface. This process adds expense due to high cost of EVA and also adds complexity due to the additional extrusion coating process.

Other attempts and improving the bond strength of the BOPP layer to the substrate include multilayer structures where the BOPP layer is bonded to a sealant layer which in turn is bonded to the substrate. In U.S. Pat. No. 6,844,079, for example a sealant layer comprising a carboxylic acid or an ester of a carboxylic acid is taught. Such carboxylic acid containing materials, however, do not adequately bond the BOPP layer, thus requiring intermediate tie layers. This again adds complexity and expense to the film design. Accordingly, it would be beneficial for some applications if polymers comprising units derived from carboxylic acids or esters of carboxylic acids could be eliminated or at least greatly reduced.

US 2004/0105994 teaches a multilayer film with a base layer containing a thermoplastic polymer and at least one outer layer containing a low melting point polymer. This reference favors an outer layer comprising a carboxylic acid derived polymer and the inclusion of intermediate layers to promote the adhesion between the preferred outer layer and base layer. This also adds complexity and expense to the film design.

Accordingly, there is a market need to develop a solvent and adhesive free lamination process, which does not require additional coating processes or intermediate tie layers.

The present invention meets at least some of these objectives by providing in one aspect of the present invention, a film structure is provided which comprises a first layer comprising homopolymer polypropylene, and a second layer comprising a polyolefin material with a melting point of from 90° C. to 105° C. The second layer in such film structure is at least three microns thick.

In another aspect of the present inventing, a laminate comprising a substrate and a film structure laminated thereto is provided, in which the film structure comprises a first layer comprising homopolymer polypropylene, and a second layer comprising a polyolefin material with a melting point of from 90° C. to 105° C. The second layer in such film structure is at least three microns thick.

DETAILED DESCRIPTION OF THE INVENTION

Figure 1:
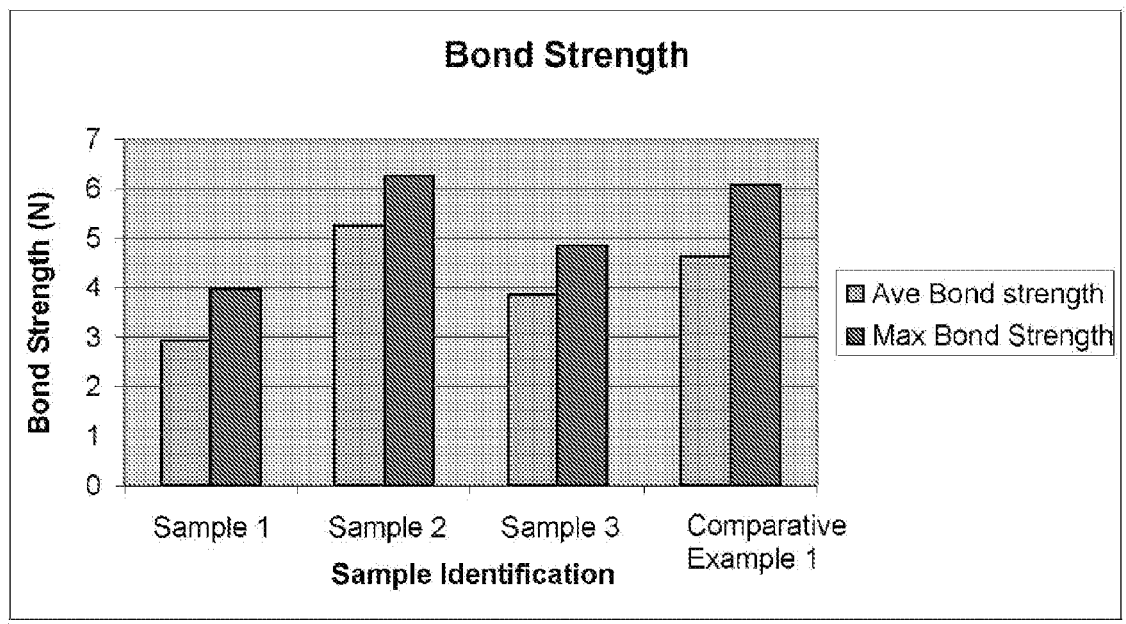
FIG. 1 is a bar graph depicting average and maximum bond strengths of inventive and comparative blown film structures to carton paper

In one aspect the present invention is a film structure is provided which comprises a first layer comprising homopolymer polypropylene. The homopolymer polypropylene can be an isotactic polypropylene homopolymer having an isotacticity of from 89 to 99 percent (as measured by 13C NMR spectroscopy using meso pentads. The polypropylene preferably has a melting point of from 140° C. to 170° C., more preferably 155° C. to 165° C. The polypropylene also preferably has a melt flow rate of from 0.5 to 15 g/10 minutes (as measured according to ASTM D1238, 2.16 kg, 230° C.), more preferably from 1.5 g/10 minutes to 6.5 g/10 minutes, still more preferably from 2.0 g/10 minutes to 5.0 g/10 minutes.

The isotactic propylene polymer may be produced by using Ziegler-Natta or metallocene catalysts. Metallocene-catalyzed isotactic polypropylenes made developmentally or commercially are EOD 96-21 and EOD 97-09, from Fina Oil and Chemical Co., EXPP-129, from ExxonMobil Chemical Co., Novalen M, from BASF GmbH., and H314-02Z from the Dow Chemical Company among others.

The film structure also contains a second layer comprising a polyolefin material with a melting point of from 90° C. to 105° C. The polyolefin material for the second layer can be any material or blend of materials (including minor amounts of components with a melting point outside the range of 90° C. to 105° C.) so long as the material as a whole has a melting point falling within the indicated range. Of particular relevance are the linear low density polyethylene resins (particularly the homogeneously branched linear low density resins), propylene based elastomers and plastomers, and olefin block copolymers.

Suitable homogeneously branched ethylene/α-olefin plastomers or elastomers include linear and substantially linear ethylene polymers. The homogeneously branched interpolymer is preferably a homogeneously branched substantially linear ethylene/alpha-olefin interpolymer as described in U.S. Pat. No. 5,272,236. The homogeneously branched ethylene/alpha-olefin interpolymer can also be a linear ethylene/alpha-olefin interpolymer as described in U.S. Pat. No. 3,645,992 (Elston).

The substantially linear ethylene/alpha-olefin interpolymers discussed above are not "linear" polymers in the traditional sense of the term, as used to describe linear low density polyethylene (for example, Ziegler polymerized linear low density polyethylene (LLDPE)), nor are they highly branched polymers, as used to describe low density polyethylene (LDPE). Substantially linear ethylene/alpha-olefin interpolymers suitable for use in the present invention are herein defined as in U.S. Pat. No. 5,272,236 and in U.S. Pat. No. 5,278,272. Such substantially linear ethylene/alpha-olefin interpolymers typically are interpolymers of ethylene with at least one $C_3$-$C_{20}$ alpha-olefin and/or $C_4$-$C_{18}$ diolefins. Copolymers of ethylene and 1-octene are especially preferred.

The preferred linear low density polyethylenes will have a Melt Index of between 1 and 50 g/10 min (as determined by ASTM D-1238, Condition 190° C./2.16 kg (formally known as "Condition (E)" and also known as $I_2$) and a density in the range of from 0.855 g/cc to 0.95 g/cc as determined by ASTM D-792 most preferably less than about 0.9.

Exemplary substantially linear low density polyethylene copolymers suitable for use in the present invention include various grades of AFFINITY™ polymer, such as AFFINITY™ PL1850G; AFFINITY™ PF1140G; and AFFINITY™ PT1450G, commercially available from The Dow Chemical Company.

Another preferred class of olefins for use in the second layer of the film structures in the present invention are reactor grade propylene based elastomers or plastomers having molecular weight distribution (MWD) less than about 3.5, and having heat of fusion less than about 90 joules/gm, preferably less than about 70 joules/gm, more preferably less than about 50 joules/gm. Suitable propylene based elastomers and/or plastomers are taught in WO03/040442, which is hereby incorporated by reference in its entirety. As disclosed in that reference these materials are derived from a majority of propylene monomer along with at least one additional comonomer, such as ethylene, a $C_{4-20}$ α-olefin, a $C_{4-20}$ diene, a styrenic compound and the like. Preferably the comonomer is at least one of ethylene and a $C_{4-12}$ α-olefin such as 1-hexene or 1-octene. Preferably, the remaining units of the copolymer are derived only from ethylene.

When ethylene is used as a comonomer, the reactor grade propylene based elastomer or plastomer has from 3 to 15 percent (by weight of the propylene based elastomer or plastomer) of ethylene, preferably from 5 to 14 percent of ethylene, more preferably 9 to 12 percent ethylene, by weight of the propylene based elastomer or plastomer.

It is intended that the term "reactor grade" is as defined in U.S. Pat. No. 6,010,588 and in general refers to a polyolefin resin whose molecular weight distribution (MWD) or polydispersity has not been substantially altered after polymerization.

The amount of comonomer other than ethylene in the propylene based elastomer or plastomer is a function of, at least in part, the comonomer and the desired heat of fusion of the copolymer. If the comonomer is ethylene, then typically the comonomer-derived units comprise not in excess of about 15 wt percent of the copolymer. The minimum amount of ethylene-derived units is typically at least about 3, preferable at least about 5 and more preferably at least about 9, wt percent based upon the weight of the copolymer.

The density of the propylene based elastomers or plastomers of this invention is typically at least about 0.850, preferably at least about 0.860 and more preferably at least about 0.865, grams per cubic centimeter (g/cm³).

The weight average molecular weight (Mw) of the propylene based elastomers or plastomers of this invention can vary widely, but typically it is between 10,000 and 1,000,000 (with the understanding that the only limit on the minimum or the maximum $M_w$ is that set by practical considerations). For homopolymers and copolymers used in the manufacture of melt blown fabrics, preferably the minimum Mw is about 20,000, more preferably about 25,000.

The polydispersity of the propylene based elastomers or plastomers of this invention is typically between 2 and 3.5. "Narrow polydispersity", "narrow molecular weight distribution", "narrow MWD" and similar terms mean a ratio ($M_w$/$M_n$) of weight average molecular weight ($M_w$) to number average molecular weight ($M_n$) of less than about 3.5, preferably less than about 3.0, more preferably less than about 2.8, more preferably less than about 2.5, and most preferably less than about 2.3. Polymers for use in fiber applications typically have a narrow polydispersity. Blends comprising two or more of the polymers of this invention, or blends comprising at least one copolymer of this invention and at least one other polymer, may have a polydispersity greater than 4 although for spinning considerations, the polydispersity of such blends is still preferably between 2 and 4.

The propylene based elastomers or plastomers of this invention typically have an MFR of at least about 1, preferably at least about 5, more preferably at least about 10 still more preferably at least about 15 and most preferably at least about 25. The maximum MFR typically does not exceed about 2,000, preferably it does not exceed about 1000, more preferably it does not exceed about 500, still more preferably it does not exceed about 200 and most preferably it does not exceed about 70. MFR for copolymers of propylene and ethylene and/or one or more $C_4$-$C_{20}$ α-olefins is measured according to ASTM D-1238, condition L (2.16 kg, 230 degrees C.).

The propylene based elastomer or plastomer of this invention can be made by any process, and include copolymers made by Zeigler-Natta, CGC, metallocene, and nonmetallocene, metal-centered, heteroaryl ligand catalysis. These copolymers include random, block and graft copolymers although preferably the copolymers are of a random configuration. Exemplary propylene copolymers include Exxon-Mobil VISTAMAXX polymer, and VERSIFY™ polymer, such as VERSIFY™ DP2200 and VERSIFY™ DP3200, by The Dow Chemical Company.

Olefin block copolymers, also known as "OBCs" or olefin multi-block interpolymers, are a relatively new class of material which are more fully described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983; each publication being fully incorporated herein by reference.

The OBCs may be made with two catalysts incorporating differing quantities of comonomer and a chain shuttling agent. Preferred olefin multi-block interpolymers are ethylene/α-olefin multi-block interpolymers. The ethylene/α-olefin multi-block interpolymers typically comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers.

The ethylene multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprise all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from 1 weight percent to 99 weight percent of the total weight of the block interpolymer, preferably from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in WO/2008/080111, entitled "Ethylene/α-Olefin Block Interpolymers", with a priority date of Mar. 15, 2006, in the name of Colin L. P. Shan, Lonnie Hazlitt, et. al. and assigned to Dow Global Technologies Inc., the disclosure of which is incorporated by reference herein in its entirety.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In one embodiment, an ethylene/α-olefin multi-block interpolymer has an ethylene content of from 60 to 90 percent, a diene content of from 0 to 10 percent, and an α-olefin content of from 10 to 40 percent, based on the total weight of the polymer. In one embodiment, such polymers are high molecular weight polymers, having a weight average molecular weight (Mw) from 10,000 to 2,500,000, preferably from 20,000 to 500,000, more preferably from 20,000 to 350,000; a polydispersity less than 3.5, more preferably less than 3 and as low as about 2; and a Mooney viscosity (ML (1+4) at 125° C.) from 1 to 250.

In one embodiment, the ethylene multi-block interpolymers have a density of less than about 0.90, preferably less than about 0.89, more preferably less than about 0.885, even more preferably less than about 0.88 and even more preferably less than about 0.875, g/cc. In one embodiment, the ethylene multi-block interpolymers have a density greater than about 0.85, and more preferably greater than about 0.86, g/cc. Density is measured by the procedure of ASTM D-792. Low density ethylene multi-block copolymers are generally characterized as amorphous, flexible, and have good optical properties, for example, high transmission of visible and UV-light and low haze.

In one embodiment, the ethylene multi-block interpolymers have a melting point of less than about 125° C. The melting point is measured by the differential scanning calorimetry (DSC) method described in U.S. Publication 2006/0199930 (WO 2005/090427), incorporated herein by reference.

OBCs are commercially available from The Dow Chemical Company under the INFUSE™ trademark, and include INFUSE™ D9100, INFUSE™ D9500.

It should also be understood that the second layer may also comprise a blend of materials so long as the overall melting point remains within the range of from 90° C. to 105° C. Such blends include blending two or more of the preferred propylene based elastomers, linear low density polyethylenes, or olefin block copolymers, as well as blending in other polymers including other polyolefins such as conventional low density polyethylene and heterogeneously branched linear low density polyethylene. Although the linear low density polyethylenes have good bond strength with isotactic polypropylene, blending propylene based plastomers and elastomers into linear low density polyethylene is hypothesized to further improve the second layer's adhesion with the isotactic polypropylene in the core layer.

Blending materials other than the preferred propylene based elastomers, linear low density polyethylenes, or olefin block copolymers may reduce cost and reduce stickiness of the resin. When such other materials are used it is preferred that that such material comprise form zero to 80 percent by weight of the second layer, more preferably from zero to thirty percent.

In order to facilitate lamination to a substrate, it is preferred that the second layer be at least 3 microns thick, more preferably 4 microns thick and can be less than 8 microns thick or even less than about 6 microns thick.

It is also preferred that the second layer comprise from 10 to 35 percent by weight of the entire film, more preferably from 15 to 30 percent.

The film structure of the present invention may also include additional layers so as to form a 3, 4, 5 or more layered structure. In such cases, the second layer comprising the polyolefin material having a melting point from 90° C. to 105° C. may be used as either the lamination layer or an intermediate layer between the lamination layer and the core layer (comprising the isotactic propylene polymer). When the polyolefin material having a melting point from 90° C. to 105° C. is used in the intermediate layers, the plastomer resin(s) functions to improve the layer thickness of lamination layer or can function as a tie layer between lamination layer and core layer. In general, for film structures involving 3 or more layers, the homopolymer polypropylene material should make up 60 to 85 percent by weight of the film, with the polyolefin material having a melting point of 90-105, making up 15 to 40 percent and the remaining material making up preferably no more than 25 percent.

As will be readily understood by practitioners in the art, it is also contemplated that any of the resins used in the present invention (in either the first, second or additional layer) may include minor amounts of additives such as antioxidants (for example, hindered phenols, for example, Irganox® 1010 made by Ciba-Geigy Corp.), phosphites (for example, Irgafos® 168 made by Ciba-Geigy Corp.), cling additives (for example, polyisobutylene (PIB)), polymeric processing aids (such as Dynamar™ 5911 from Dyneon Corporation, and Silquest™ PA-1 from General Electric), antiblock additives, slip additives such as Erucamide, pigments, etc. In some applications additives may advantageously be used in skin layer to reduce stickiness in machine direction orientation-rollers (MDO) during process and modify the coefficient of friction (COF) to desired levels for ease of handling.

The two or more layers which comprise the film structure of the present inventing are preferably coextruded using conventional multi-layer film technology. The coextruded film structures may then be oriented using conventional methods such as monoaxial, biaxial orientation via double bubble or tenterframe equipment. In case of tenter frame, a thick sheet (for example between 500 micron to 1200 micron) is preferably produced first. The sheet can be quenched by cooling roller in a water bath containing cool water (for example, around 18-20° C.), and then the sheet can be preheated via a set of heating rollers. The heated sheet can be oriented in the machine direction ("MD") between two pairs of MD orientation rollers. The MD oriented sheet can then go to a cross direction ("CD") orientation oven for CD orientation. Orientation ratios vary depending on the application and process, but typical values are 4-6× in the MD and 7-10× in the CD. Annealing is frequently conducted after the orientation process to improve the dimensional stability of the film.

Once the biaxially oriented film structure is prepared, the film structure can be directly laminated to a substrate, preferably by direct hot lamination between heated metal roller and nip rubber roller (for example with a temperature of between 90° C. and 120° C., nip roll pressure between 0.1 MPA to 3 Mpa and line speed between 5-100 m/min). Alternatively, prior to lamination, the film structures may be surface treated for further converting process. It is also contemplated that the film structures may be printed prior to lamination.

The film structures of the present invention may be laminated onto any desired substrate. The film structure of the present invention are particularly well suited for lamination onto paper substrates including craft paper, carton paper, corrugated paper, newspaper, magazine paper etc. Without intending to provide an exhaustive list, the films of the present invention can also be thermally laminated to PET film, metallized PET film, CPP film and PE film.

EXAMPLES

To demonstrate the present invention a series of experiments can be conducted as follows: The following materials are used in these Examples Resin A (AFFINITY PL1850G) is an ethylene/1-octene linear low density polyethylene resin made by solution process having a melt index (measured according to ASTM 1238-E 190° C. 2.16 KG) of 3.0 g/10 min, with a density (measured according to ASTM D792) of 0.902 g/cc; The melting point of Resin A is 98° C.

Resin B (VERSIFY DP2200) is a propylene based plastomer made by solution process having a melt flow rate (propylene based resins measured according to ASTM 1238-E at 230° C. 2.16 KG) of 2.0 g/10 min and a density: 0.877 g/cc. The melting point of Resin B is 80° C.

Resin C (DOWLEX 2045G) is a linear low PE made by Zigler Natta catalyst having a melt index (measured according to ASTM 1238-E 190° C. 2.16 KG) of 1.0 g/10 min, with a density (measured according to ASTM D792) of 0.920 g/cc. The melting point of Resin C is 120° C.

Resin D (AFFINITY PT 1450G1) is an ethylene/1-octene linear low density polyethylene resin made by solution process having a melt index 7.5 g/10 min and a density of 0.902 g/cc; The melting point of Resin D is 98° C.

Resin E (F-280S) is Homo-PP made by Zigler Natta catalyst having a melt index (measured according to ASTM 1238-E 230° C. 2.16 KG) of 3.0 g/10 min, with a density (measured according to ASTM D792) of 0.900 g/c. The melting point of Resin E is 165° C.

Examples 1-3

Co-extruded blown films are made to test the thermal bond strength with carton paper. The multi-layer blown film structures are produced as follows: The film sample are made on a conventional 3 layer co-extrusion blown film line. The set temperatures for the film extrusion is around 180° C., but higher or lower temperatures can be used depending on machine output, screw design and other factors. The thickness of all film samples is 30 micron with a 20/60/20 layer ratio. The A/B/B film structures are produced with the outer layer and core layers (B layers) composed of neat LDPE 100 AC (2.0 g/10 min. Density: 0.920 g/cc) made by YanShan Petrochemical. (LDPE is used because of availability, and while not within the scope of the claims due to the differing first layer, it is believed that the bond strength data presented below is still relevant as the separation occurred between the substrate and the "A" layer). All films are corona treated on the A layer with treatment level about 40 dyne.

The A layer is as indicated below (all percentages by weight):

Example 1: 62 percent Resin A blended with 14 percent Resin B and 24 percent Resin C Example 2: 86 percent Resin A blended with 14 percent Resin B Example 3: 70 percent Resin A blended with 30 percent Resin B Samples of the films (inventive examples 1, 2, and 3 and comparative example 1) are laminated on a thermal lamination line. The operation condition is as below: Lamination nip roll pressure is 2.5 MPa, contact angle was 45 Degree, lamination speed is about 20 m/min, Lamination roll temperature is 100° C. The laminated samples were conditioned in the laboratory for 1 day. The laminates were analyzed for bond strength and compared with a commercially obtained BOPP adhesive coated film (comparative Example 1). Although detailed information related to the coating was unavailable, but is thought to be based on a latex adhesive.

The Bond strength test is determined using a 25 mm film specimen with the Instron testing appratusset to pull at 125 mm/min. Results from this test are presented in FIG. 1. Example 1 demonstrates that Ziegler-natta type LLDPE can be added to address potential stickiness during commercial orientation process and/or to reduce the film cost while maintaining acceptable thermal lamination strength.

Examples 4-5

Co-extruded A/B/B film structures are made on a commercial Bruckner tenterframe BOPP line. Layer A in each case is made up of 100 percent Resin D. Layer B in each case is 100 percent Resin E. The dimensions of the A and B layers are as indicated below:
Example 4: 6 microns layer A; 12 microns (total) layer B
Example 5: 4 microns layer A; 14 microns (total) layer B
The fabrication conditions for the films are shown below:
Line speed: 250 m/min
Extruder melt temperature for Homo-PP: 250 c
Extruder melt temperature for AFFINITY: 230 C
MDO orientation temperature: 125-135 C
CD orientation temperature: 155 C
MD/CD orientation ratio: 5/11

Figure 2:
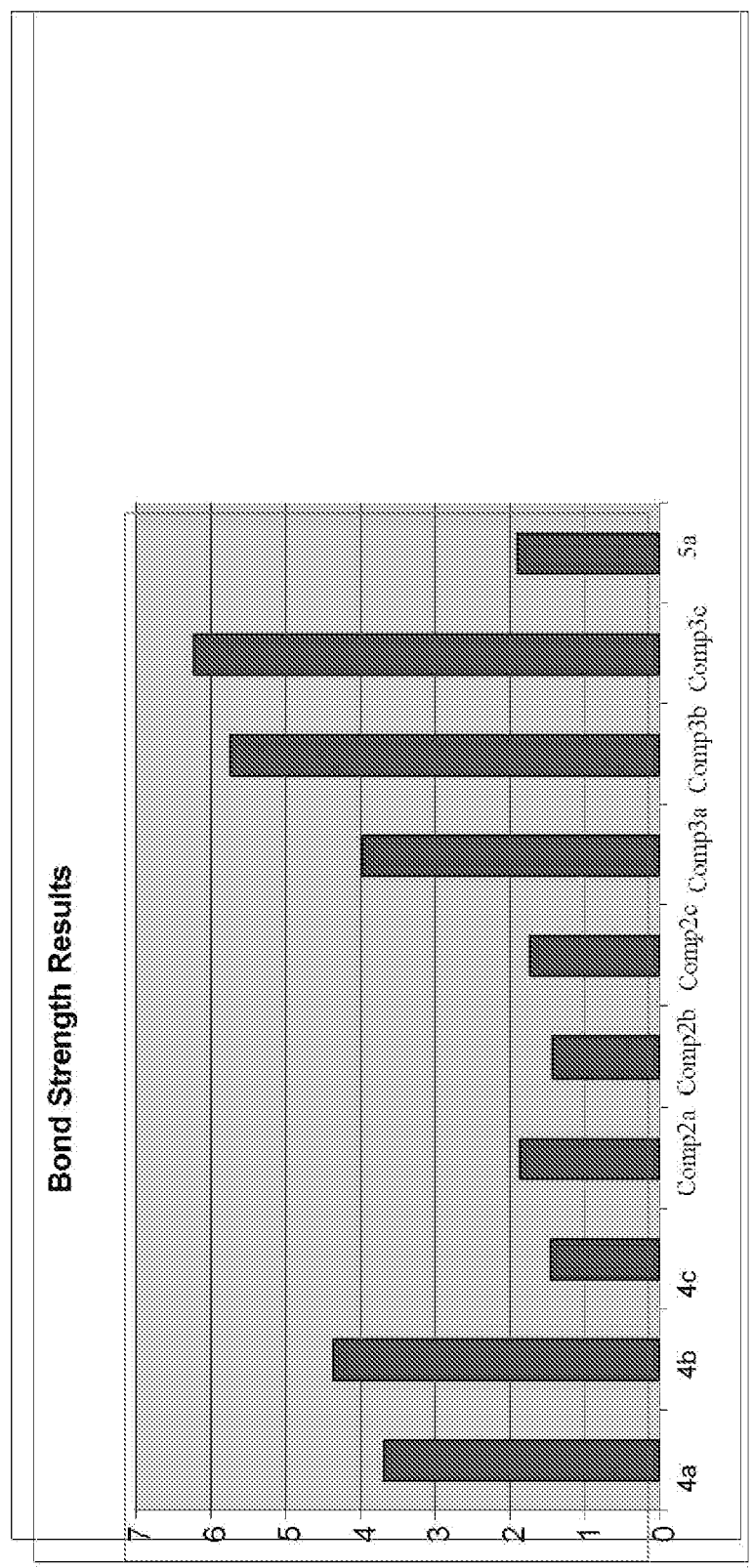
FIG. 2 is a bar graph depicting bond strengths of inventive and comparative film structures made on a tenterframe operation to various paper substrates.

These film structures are then thermally laminated with different kinds of paper to assess their lamination and adhesion performance. All examples designated "a" in FIG. 2 are laminated to printed Craft paper, all examples designated "b" are laminated to printed Carton paper, and all examples designated "c" are laminated to non-printed Carton paper. All examples are laminated under the following conditions: Nip roll pressure is 2.5 MPa, contact angle is 45 Degree, lamination speed is about 20 m/min, nip roll temperature of 100° C. The laminated samples were conditioned in the laboratory for 1 days. The BOPP//paper laminates were tested for bond strength using the test method described above.

These examples are compared against 2 commercially obtained samples. Comparative Example 2 is a water based adhesive coated BOPP (18 micron)/Paper laminate and Comparative Example 3 is an OPP/EVA/Paper structure. (OPP/EVA is two ply structure with 12 micron EVA coating on 18 micron BOPP film for paper lamination)

The results of this evaluation are shown in FIG. 2 (units N/25 mm).

The invention claimed is:

1. A film structure composition comprising:
 a. a first layer comprising homopolymer polypropylene
 b. a second layer comprising a polyolefin material selected from the group consisting of linear low density polyethylene resins, propylene based elastomers and plastomers, and olefin block copolymers, wherein said polyolefin material has a melting point of from 90° C. to 105° C.; and
 wherein the second layer is at least 3 microns thick.

2. The film structure of claim 1 wherein the structure is characterized by the absence of any layer between the first layer and the second layer.

3. The film structure of claim 1 wherein the first layer bonds with the second layer.

4. The film structure of claim 1 wherein the homopolymer polypropylene has a melt flow rate in the range of from 2 to 8 g/10 min as determined according to ASTM D1238, 2.16 kg, 230° C.

5. The film structure of claim 1 wherein the second layer comprises
 homogeneously branched low density linear polyethylene.

6. The film structure of claim 1 wherein the second layer comprises a reactor grade propylene based elastomer or plastomer having molecular weight distribution (MWD) less than about 3.5 and having heat of fusion less than about 90 joules/gm.

7. The film structure of claim 6 wherein the reactor grade propylene based elastomer or plastomer has a heat of fusion less than about 70 joules/gm.

8. The film structure of claim 7 wherein the reactor grade propylene based elastomer or plastomer has a heat of fusion less than about 50 joules/gm.

9. The film structure of claim 1 wherein the second layer comprises olefin block copolymer.

10. Paperboard having a film structure laminated thereto wherein the film structure comprises:
 a. a first layer comprising homopolymer polypropylene
 b. a second layer comprising a polyolefin material selected from the group consisting of linear low density polyethylene resins, propylene based elastomers and plastomers, and olefin block copolymers, wherein said polyolefin material has a melting point of from 90° C. to 105° C.; and
 wherein the second layer is at least 3 microns thick.

* * * * *